(12) United States Patent
Fukawa et al.

(10) Patent No.: US 7,195,378 B2
(45) Date of Patent: Mar. 27, 2007

(54) VEHICLE LIGHTING APPARATUS

(75) Inventors: Kiyotaka Fukawa, Shizuoka (JP); Masao Okawa, Shizuoka (JP); Naohisa Tatara, Shizuoka (JP); Makoto Izawa, Shizuoka (JP); Takahisa Nakamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/888,884

(22) Filed: Jul. 9, 2004

(65) Prior Publication Data
US 2005/0117358 A1 Jun. 2, 2005

(30) Foreign Application Priority Data
Jul. 10, 2003 (JP) ............... P. 2003-272723

(51) Int. Cl.
*B60Q 1/08* (2006.01)
(52) U.S. Cl. .............. 362/465; 362/466; 362/468; 362/469
(58) Field of Classification Search ......... 362/465, 362/460, 464, 468; 340/465, 466, 475, 903, 340/435, 555, 556, 436; 200/61.31; 359/196, 359/533, 546, 548
See application file for complete search history.

(56) References Cited

U.S. PATENT DOCUMENTS

| 5,404,278 | A | * | 4/1995 | Shibata et al. | 362/464 |
| 5,876,113 | A | * | 3/1999 | Gotoh | 362/466 |
| 6,481,876 | B2 | * | 11/2002 | Hayami et al. | 362/464 |
| 6,578,993 | B2 | * | 6/2003 | Kobayashi et al. | 362/466 |
| 6,626,563 | B2 | * | 9/2003 | Nishimura et al. | 362/465 |
| 6,633,027 | B2 | * | 10/2003 | Kobayashi et al. | 250/208.1 |
| 6,726,349 | B2 | | 4/2004 | Uchida | |
| 6,805,472 | B2 | | 10/2004 | Fukawa | |
| 7,036,963 | B2 | * | 5/2006 | Fukawa | 362/465 |
| 2002/0001195 | A1 | | 1/2002 | Iwamoto et al. | |
| 2004/0114379 | A1 | * | 6/2004 | Miller et al. | 362/464 |

FOREIGN PATENT DOCUMENTS

DE  101 04 773 A1  8/2001

(Continued)

*Primary Examiner*—Sandra O'Shea
*Assistant Examiner*—Anabel Ton
(74) *Attorney, Agent, or Firm*—Fish & Richardson P.C.

(57) ABSTRACT

In a vehicle lighting apparatus in which the irradiation direction of lamps provided at the left and right portions of an automobile can be deflected to the left and right directions in association with the steering operation of a steering apparatus, the deflection angles of the left and right lamps are changed in different manners in accordance with a vehicle speed, for example. For example, at the time of steering to the right, when a vehicle speed is a predetermined value or less, only the right lamp is subjected to the deflecting operation, while when a vehicle speed exceeds the predetermined value, both the right and left lamps are simultaneously subjected to the deflecting operation. The deflection angles of the left and right lamps are differentiated in accordance with the speed change of an automobile. Thus, it can realize such irradiation that at the time of high speed traveling where an automobile travels while steering to the left and right, the visibility in an area ahead of an automobile is improved, while at the time of middle and low speed traveling, the visibility in an area just ahead of an automobile is improved.

5 Claims, 10 Drawing Sheets

FOREIGN PATENT DOCUMENTS

| | | |
|---|---|---|
| DE | 102 20 373 A1 | 11/2002 |
| DE | 102 46 356 A1 | 4/2003 |
| DE | 601 12 508 T2 | 3/2006 |
| JP | 62-244735 | 10/1987 |
| JP | 08-301005 | 11/1996 |
| JP | 2002-160581 | 6/2002 |

\* cited by examiner

FIG. 8

| VEHICLE SPEED | CURVED TO LEFT | CURVED TO RIGHT |
|---|---|---|
| LOW SPEED (a) | ROAD 1, RH, LH, S1, CAR | RH, ROAD 1, LH, S1, CAR |
| MIDDLE SPEED (b) | ROAD 2, RH, LH, S2, CAR | RH, ROAD 2, LH, S2, CAR |
| HIGH SPEED (c) | ROAD 3, S3, LH, RH, CAR | RH, ROAD 3, LH, S3, CAR |

LH: IRRADIATION BY LEFT SWIVEL TYPE LAMP
RH: IRRADIATION BY RIGHT SWIVEL TYPE LAMP

VEHICLE LIGHTING APPARATUS

TECHNICAL FIELD

The present disclosure relates to a lighting apparatus for a vehicle which can be applied to a headlight apparatus of a vehicle such as an automobile and, in particular, relates to a vehicle lighting apparatus which can be provided with a light distribution control means, for example, an adaptive front-lighting system (hereinafter referred to as AFS) for changing the illumination direction and area of a lamp in accordance with a traveling state.

BACKGROUND

As the AFS proposed in order to improve the traveling safety of an automobile, there is a technique described in a Japanese patent document, JP-A-2002-160581. As shown in the schematic diagram of FIG. 1, an automobile (CAR) is provided with a steering sensor 1A for detecting a steering angle of a steering apparatus and a vehicle speed sensor 1B for detecting a vehicle speed. The detection outputs of these sensors 1A, 1B are inputted into an electronic control unit (hereinafter referred to as ECU) 2. The ECU 2 controls the irradiation area, e.g., the irradiation direction of head lamps (or headlights) 3 (swivel type lamps 3R, 3L) provided at the right and left front portions of an automobile so as to deflect in the left and right directions based on the detection outputs thus inputted thereby to change the light distribution characteristics. According to the AFS, when an automobile travels on a curved road, it is possible to deflect the irradiation direction of the swivel type lamps in accordance with the steering angle of the automobile to illuminate the portion of the road ahead of the curve, thereby being effective in improving traveling safety.

In such an AFS, when the left 3L and right 3R swivel type lamps are controlled so as to deflect merely in accordance with the steering angle, there arise various kinds of inconveniences. Various trials have been performed in order to eliminate such inconveniences. For example, Japanese patent document, JP-A-8-301005, proposes a technique in which the changing rate of the deflection of the swivel type lamps is made large so as to control the deflection angle thereof to a large extent at the time of high speed traveling, and a portion of the road farther away in the traveling direction is irradiated earlier as the speed becomes higher thereby to improve the visibility of the portion ahead of a traveling road. Further, JP-A-8-301005 proposes a technique in which, in order to eliminate a sense of incongruity due to the delay of the deflection operation of the swivel type lamps relative to a steering operation at the time of shifting from the traveling on a straight road to the traveling on a curved road, the swivel type lamps are deflected at a small changing rate even in an area where a steering angle is small like the traveling state on a straight road.

Another Japanese patent document, JP-A-62-244735, proposes a technique in which, when an automobile is steered in the left or right direction, in order to secure respective irradiation ranges in a steering direction and the direction opposite thereto to improve the visibility in a wide range, the operation timings of the deflection of left and right swivel type lamps in response to a steering angle are differentiated. In this case, for example, when an automobile is steered in the right direction, the right swivel type lamp is deflected in the right direction at first and then the left swivel type lamp is deflected in the left direction when the steering angle reaches a certain value.

As described above, in the technique disclosed in JP-A-8-301005, the deflection angle of the swivel type lamps is made large at the time of high speed traveling of an automobile to irradiate the portion ahead of a curved road. However, since both the left and right lamps perform the same deflection operation, the lamps irradiate the same area at each of the low and high speed traveling. Thus, it is difficult to achieve the irradiation which satisfies both the case where it is preferable to irradiate a large range just ahead of an automobile like at low speed traveling and the case where it is preferable to irradiate a distance area concentrically like at high speed traveling, and hence there arises a problem that the irradiation is not performed suitably in accordance with a change of the speed. Further, according to the technique of JP-A-8-301005, the changing rate of the deflection angle of the swivel type lamps with respect to the steering angle is made large at the time of traveling a road which is almost a straight road. However, since the deflection operation is not stopped completely, there arises a state where a driver feels worrisome since the deflection operation of the swivel type lamps is performed frequently as described in JP-A-8-301005.

On the other hand, in the technique disclosed in JP-A-62-244735, the operation timings of the deflection are differentiated between the left and right swivel type lamps. Thus, although it is possible to change the irradiation area, since the deflection angle with respect to the steering angle is the same at both low speed and high speed traveling, it becomes difficult to irradiate suitably a distant area ahead of an automobile traveling at a high or a middle rate of speed and to irradiate suitably the area just ahead of an automobile traveling at a low rate of speed.

Accordingly, an advantage of the invention is that it provides a vehicle lighting apparatus which can realize suitable irradiation in every traveling state of an automobile.

SUMMARY

The invention is arranged in a manner that in a vehicle lighting apparatus in which irradiation direction of lamps provided at the left and right portions of an automobile can be deflected to left and right directions in association with the steering operation of a steering apparatus, the deflection angles of the left and right lamps are changed in different manners in accordance with a vehicle speed. For example, when a vehicle speed is a predetermined value or less, only one of the left and right lamps is subjected to a deflecting operation, while when a vehicle speed exceeds the predetermined value, both the left and right lamps are simultaneously subjected to the deflecting operation. Further, the maximum deflection angle of the left and right lamps is arranged to be changed in accordance with a vehicle speed. Furthermore, the deflection angles of the left and right lamps are differentiated with respect to different steering directions, respectively.

According to an aspect of the invention, the deflection angles of the left and right lamps are differentiated in accordance with the speed change of an automobile. Thus, it can realize such irradiation that at the time of a high speed traveling where an automobile travels while steering to the left or right, the visibility in an area ahead of an automobile is improved, while at the time of middle and low speed traveling, the visibility in an area just ahead of an automobile is improved, whereby the stable traveling using the AFS can be realized.

According to an aspect of the invention, since the width of a dead zone of the deflection operation of the lamps is changed in accordance with vehicle speed, an unnecessary deflection operation of the lamps can be prevented in advance in accordance with the respective vehicle speeds, so that a driver does not feel worrisome. Further, since the rate of change of the deflection angle with respect to the steering angle is changed in accordance with vehicle speed, the change of the irradiation area is suppressed at the time of a high speed traveling, while the responsibility of the deflection with respect to the steering operation is improved at the low speed traveling. Thus, suitable irradiation can be realized at high and low speed traveling.

BRIEF DESCRIPTION OF THE DRAWINGS

FIGS. 8a, 8b and 8c are diagrams showing light distribution patterns at the time of steering to the left and right when traveling at different vehicle speeds.

DETAILED DESCRIPTION

Figure 1:
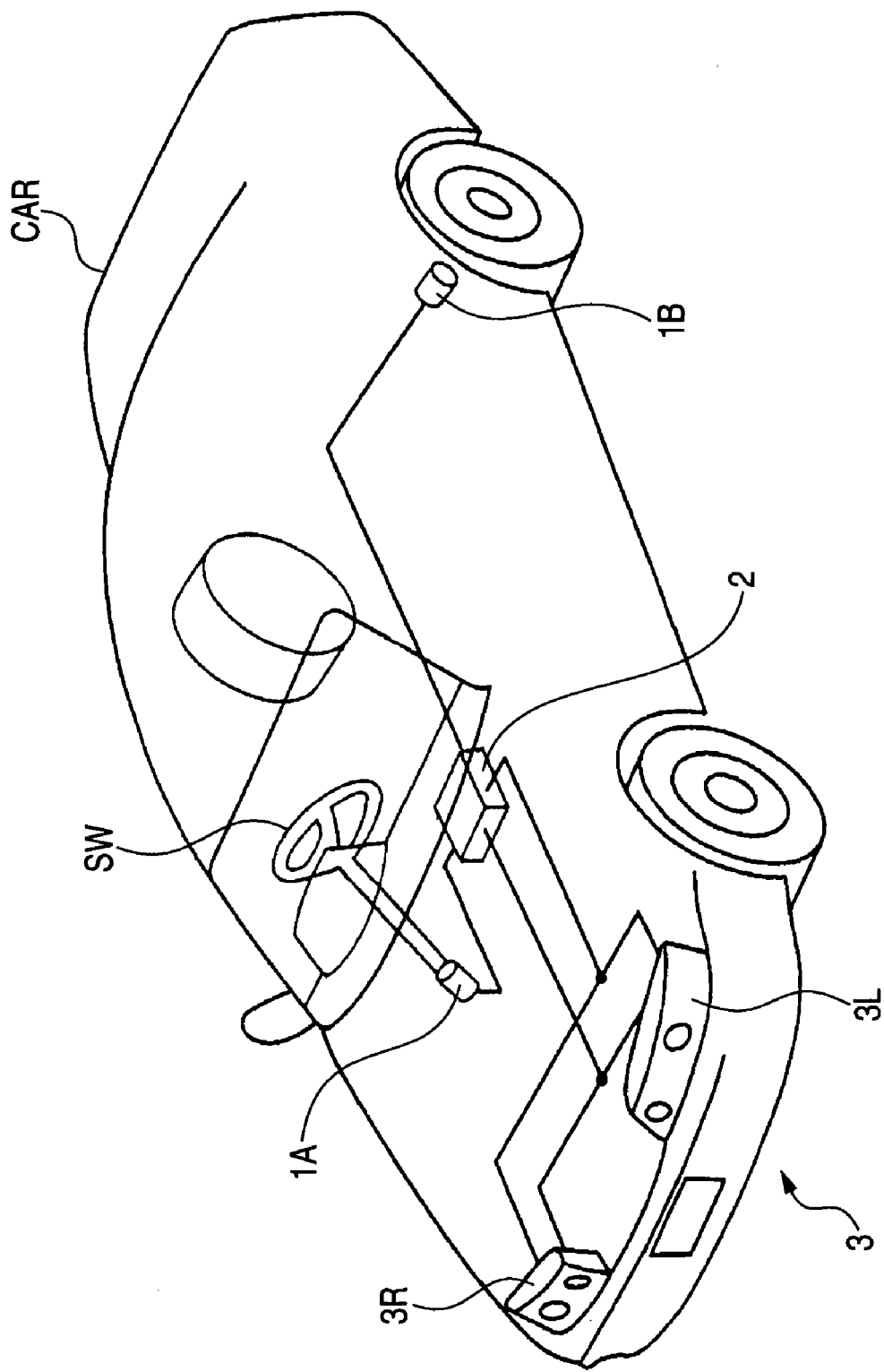
FIG. 1 is a diagram showing the schematic configuration of an AFS.
Figure 2:
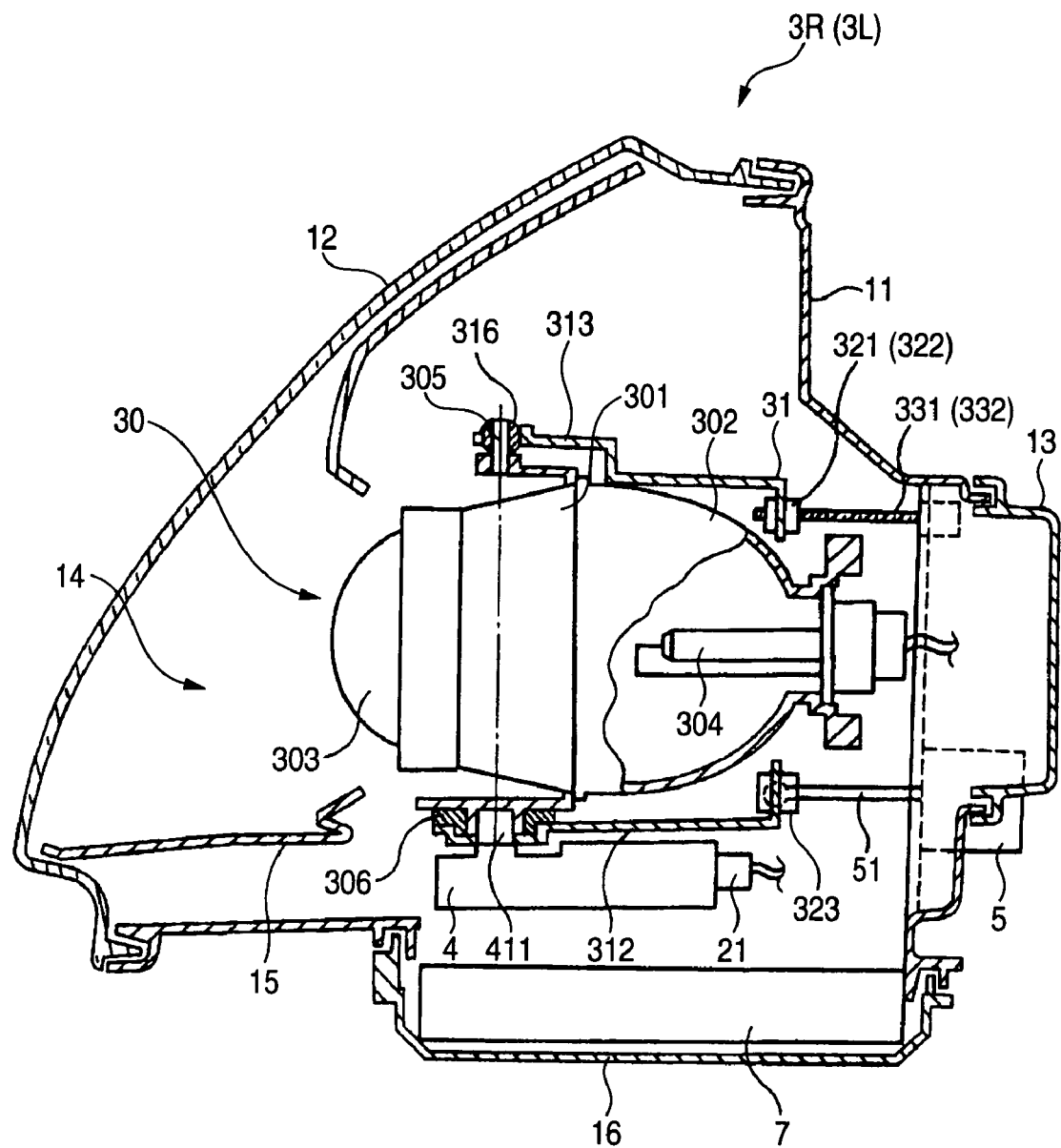
FIG. 2 is vertical sectional diagram of a swivel type lamp.
Figure 3:
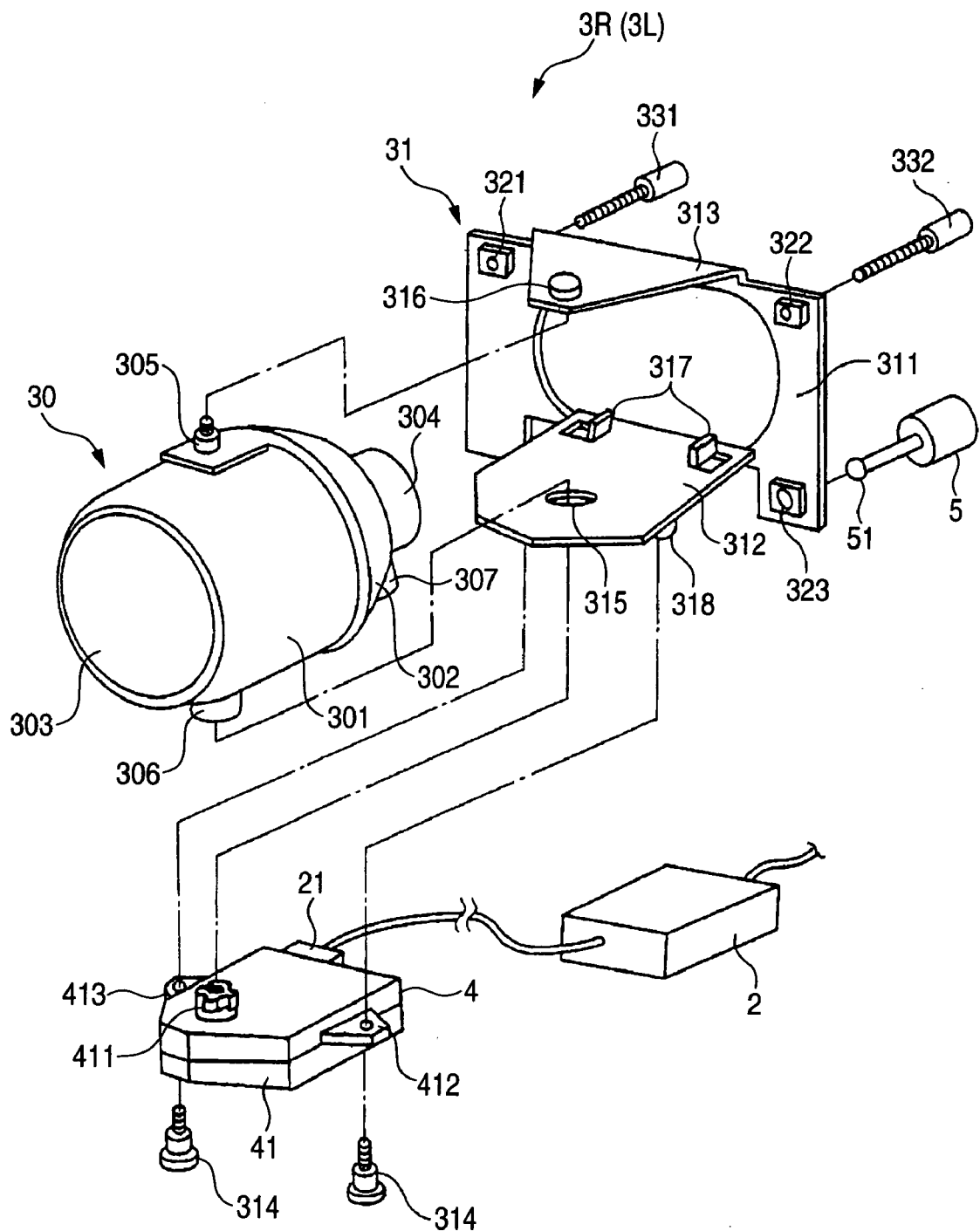
FIG. 3 is an exploded perspective view showing the main portion of the inner structure of the swivel type lamp.

Next, an embodiment of the invention will be explained with reference to the accompanying drawings. FIG. 2 is a vertical sectional diagram of the inner structure of a swivel type lamp, having the elements of the AFS explained above with reference to FIG. 1, which is capable of deflecting the irradiation direction to the left and right. FIG. 3 is a partially exploded perspective view of the main portion of the swivel type lamp. A lamp body 11 is provided with a lens 12 at the front opening thereof and a rear cover 13 at the rear opening thereof to form a lamp chamber 14. A projector lamp 30 is disposed within the lamp chamber 14. The projector lamp 30 is integrally formed by a sleeve 301, a reflector 302, a lens 303 and a light source 304. Although a detailed description of the projector lamp is not provided since the projector lamps are well known, the projector lamp using a discharge valve as the light source 304 is employed in this embodiment. The projector lamp 30 is supported by a bracket 31 configured in an almost U-shape. An extension 15 is disposed around the projector lamp 30 within the lamp body 11 so that the inner portion of the swivel type lamp is not exposed through the lens 12. Further, in this embodiment, a lighting circuit 7 for turning on the discharge valve of the projector lamp 30 is provided within the swivel type lamp by using a lower cover 16 attached to the bottom opening of the lamp body 11.

The projector lamp 30 is supported in a state of being sandwiched between a lower plate 312 and an upper plate 313 each of which is bent almost perpendicularly from the vertical plate 311 of the bracket 31. An actuator 4 described later is fixed on the lower side of the lower plate 312 by means of screws 314. The rotation output shaft 411 of the actuator 4 protrudes from the upper side through a shaft hole 315 perforated at the lower plate 312. Each of the screws 314 is fastened by a boss 318 protrusively provided on the lower surface of the lower plate 312. A shaft portion 305 provided at the upper surface of the projector lamp 30 is fit into and coupled to a bearing 316 provided at the upper plate 313, and a coupling portion 306 provided at the lower surface of the projector lamp 30 is fit into the rotation output shaft 411 of the actuator 4, whereby the projector lamp 30 is made rotatable in the right and left direction with respect to the bracket 31. Further, as described later, the projector lamp can be rotated in the horizontal direction integrally with the rotation output shaft 411 in accordance with the operation of the actuator 4.

The bracket 31 is integrally attached with aiming nuts 321, 322 at the left and right portions of the upper portion thereof when seen from the front side, respectively, and further integrally attached with a leveling bearing 323 at the lower portion on the right side thereof. The aiming nuts are screwed and engaged with a horizontal aiming screw 331 and a vertical aiming screw 332 rotatably supported by the lamp body 11 and the leveling pole 51 of the leveling mechanism 5 is fit into the leveling bearing. The bracket 31 can be rotated in the horizontal direction and the vertical direction by rotating the horizontal aiming screw 331 and vertical aiming screw 332 with respect to their shafts. Further, the bracket 31 can be rotated in the vertical direction by moving the leveling pole 51 forward and backward along the axial direction thereof by means of the leveling mechanism 5. Thus, it becomes possible to perform the aiming adjustment for adjusting the optical axis of the projector lamp 30 in the left and right directions and the vertical direction and also to perform the leveling adjustment for adjusting the optical axis of the projector lamp in the vertical direction in accordance with the leveling state caused by the change of the vehicle height. A projection 307 is protrusively provided at the lower surface of the reflector 302 of the projector lamp 30. A pair of stoppers 317 are formed at the left and right positions of the lower plate 312 of the bracket 31 opposing to the projection in a manner of being cut and bent upward from the lower plate. The projection 307 bumps against one of the stoppers 317 in accordance with the rotation of the projector lamp 30, whereby the rotation range of the projector lamp 30 is restricted.

The actuator 4 includes a case 41 having a shape similar to a pentagonal shape. The case 41 is provided with supporting pieces 412, 413 so as to protrude outside at both the side surfaces thereof, respectively. These supporting pieces are used in order to affix the case 41 to the bosses 318 of the bracket 31 by means of the screws 314. The rotation output shaft 411 configured in a spline configuration protrudes from the upper surface of the case 41 and is coupled to the coupling portion 306 of the bottom surface of the projector lamp 30. The rotation output shaft 411 is rotated reciprocally within a predetermined rotation angle by a motor 42 described later which is housed within the actuator 4. A connector (not shown) is disposed on the rear surface of the case 41 so that an external connector 21 coupled to the ECU 2 is fit into this unshown connector.

Figure 4:
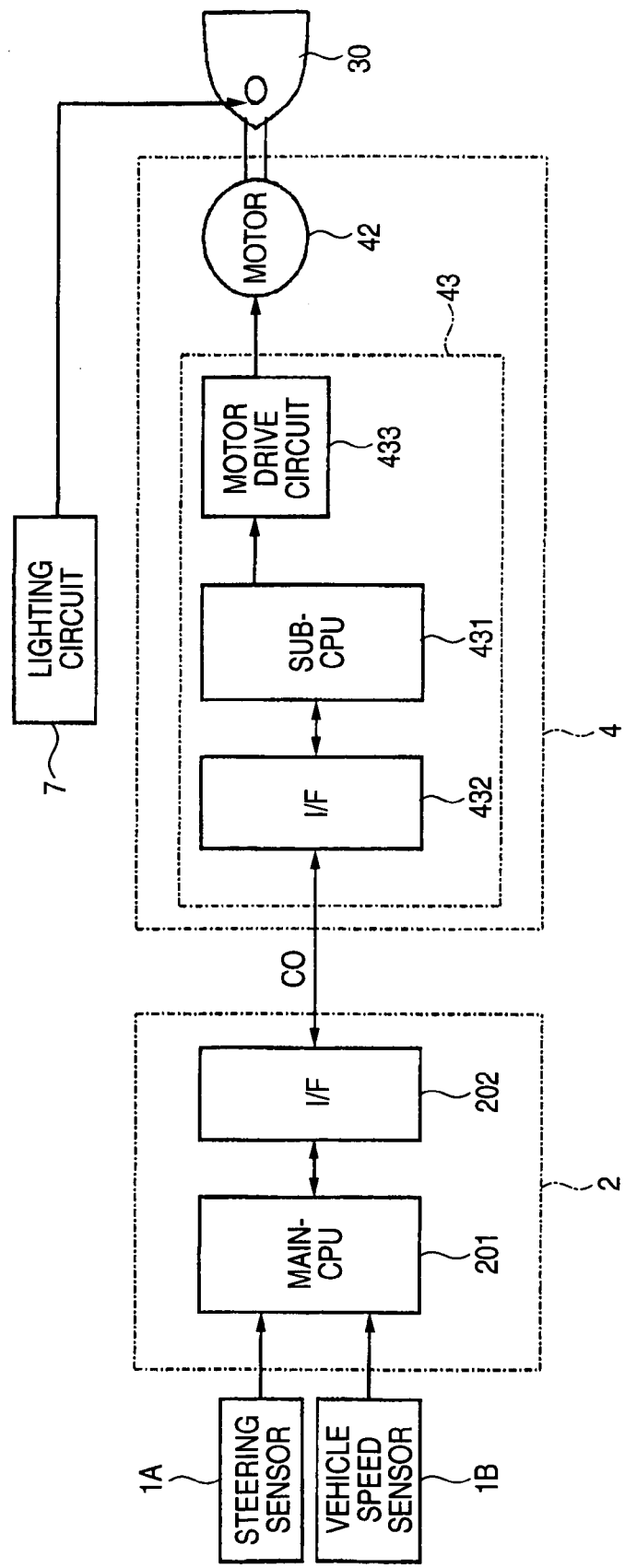
FIG. 4 is a block circuit diagram showing the circuit configuration of the AFS.

FIG. 4 is a block diagram showing the electric circuit configuration of the lighting apparatus including the ECU 2 and the actuator 4. The actuator 4 is provided at each of the right and left swivel type lamps 3R, 3L of the automobile and can communicate with the ECU 2 bidirectionally. The ECU 2 includes therein a main CPU 201 serving as a main control circuit which performs processing of a predetermined algorithm based on a steering angle and a vehicle speed respectively detected by the steering sensor 1A and the vehicle speed sensor 1B to output a predetermined control signal C0 and an interface (hereinafter referred as I/F) circuit 202 which is provided between the main CPU 201 and the actuator 4 to input and output the control signal C0. In this embodiment, the control signal C0 is a left and right deflection angle signal for controlling the optical axis deflection angle of the swivel type lamps 3R, 3L with respect to the actuator 4.

A sub-control circuit 43 constituted within the actuator 4 provided in each of the left and right swivel type lamps 3R, 3L of an automobile includes a sub-CPU 431, an I/F circuit 432 for receiving a signal from and outputting a signal to the ECU 2, and a motor drive circuit 433 for rotating a brushless motor 42 serving as a driving source which is housed within the case 41 of the actuator 4 as a rotation driving means and rotates the rotation output shaft 411. The sub-CPU 431 controls the motor drive circuit 433 thereby to drive the motor 42 in accordance with the control signal C0 from the ECU 2 which is inputted through the I/F circuit 432, whereby the deflection angle of the projector lamp 30 can be controlled.

According to the aforesaid configuration, the ECU 2 receives the signal representing the rotation angle of the steering wheel SW, that is, the steering angle of an automobile detected by the steering sensor 1A disposed in an automobile CAR and the signal representing the vehicle speed of the automobile detected by the vehicle speed sensor 1B. The ECU 2 performs the calculation at the main CPU 201 based on the detection signals thus inputted to obtain the left and right deflection angle signals C0 of the projector lamps 30 at the swivel type lamps 3R, 3L and supplies the signals to the actuators 4 of the swivel type lamps 3R, 3L, respectively. In the actuator 4, the sub-CPU 431 performs the calculation based on the left and right deflection angle signal C0 thus inputted to calculate a signal corresponding to the left and right deflection angle signal C0 and supplies the signal thus calculated to the motor drive circuit 433 to rotate the motor 42. The rotation driving speed of the motor 42 is decelerated and transmitted to the rotation output shaft 411 to rotate the projector lamp 30 coupled to the rotation output shaft 411 in the horizontal direction, whereby the irradiation direction (optical axis direction) of the swivel type lamp 3R or 3L is deflected to the left and right directions. The deflection angle of the projector lamp 30 is detected by a rotation angle sensor (not shown) and the detected deflection angle is fed back to the sub-CPU 431, whereby the projector lamp can be controlled to have a deflection angle corresponding to the left and right deflection angle signal C0.

Figure 5:
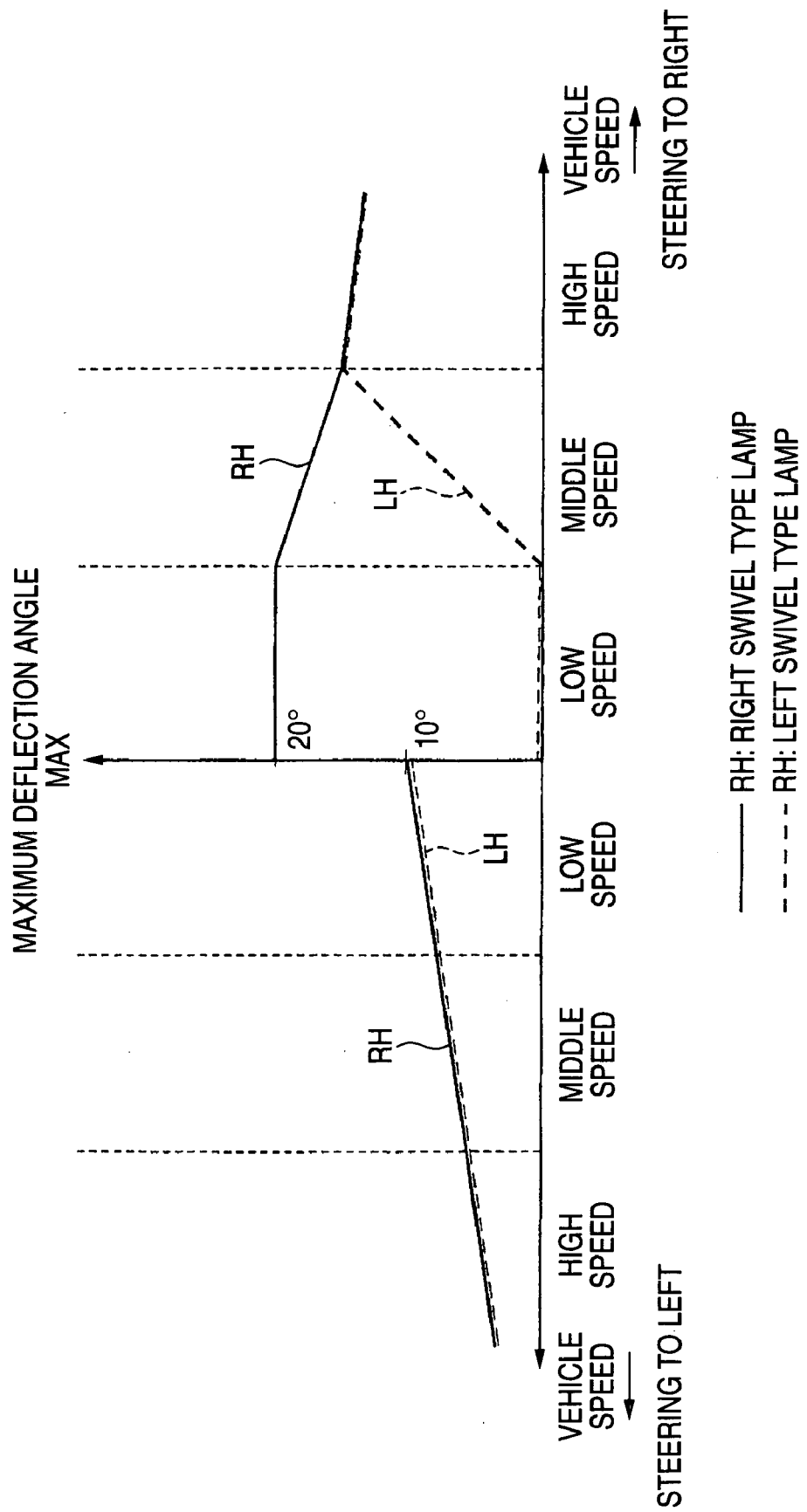
FIG. 5 is a diagram showing the characteristics of the maximum deflection angles of each of the left and right swivel type lamps with respect to vehicle speeds at the time of steering to the left and right.

FIG. 5 shows the deflection characteristics of the left and right swivel type lamps in such an AFS. This figure is based on the assumption that the traffic system is the left-hand traffic like Japan, wherein an abscissa represents a vehicle speed and an ordinate represents the deflection angle of the swivel type lamps to the left and right directions. A solid line RH represents the deflection angle characteristics of the right swivel type lamp and a broken line represents the deflection angle characteristics of the left swivel type lamp. That is, at the time of traveling on a road curved to the right thereby to steer to the right, when the vehicle speed is in a low speed range (30 Km/hour or less), only the right swivel type lamp is deflected in accordance with the steering angle and the maximum deflection angle MAX is set to 20 degrees, while the left swivel type lamp is not deflected. In a middle speed range (30 to 70 Km/hour), the right swivel type lamp is deflected in a manner that the maximum deflection angle MAX gradually reduces from 20 degrees to 15 degrees in accordance with the vehicle speed, while the left swivel type lamp is deflected in a manner that the maximum deflection angle MAX gradually increases from 0 degree to 15 degrees in accordance with the vehicle speed, and the deflection angle of each of the right and left swivel type lamps is controlled in accordance with the steering angle. In a high speed range (70 Km/hour or more), the maximum deflection angle MAX of each of the left and right swivel type lamps gradually and integrally reduces from almost 15 degrees and each of the left and right swivel type lamps is controlled in accordance with the steering angle. The aforesaid low, middle and high speed ranges are merely examples of the speed ranges and so the maximum deflection angles MAX corresponding to the speed ranges are also merely examples.

In contrast, at the time of steering to the left, the deflection angle characteristics RH, LH of the left and right swivel type lamps are the same with respect to the maximum deflection angle MAX in all the vehicle speed ranges. In this example, the deflection angle characteristics are set in a manner that the maximum deflection angle is slightly reduced in accordance with the increase of the vehicle speed within a range of almost 10 degrees to almost 5 degrees. Of course, the characteristics RH, LH may be differentiated from each other like the aforesaid case of the steering to the right.

Figure 6:
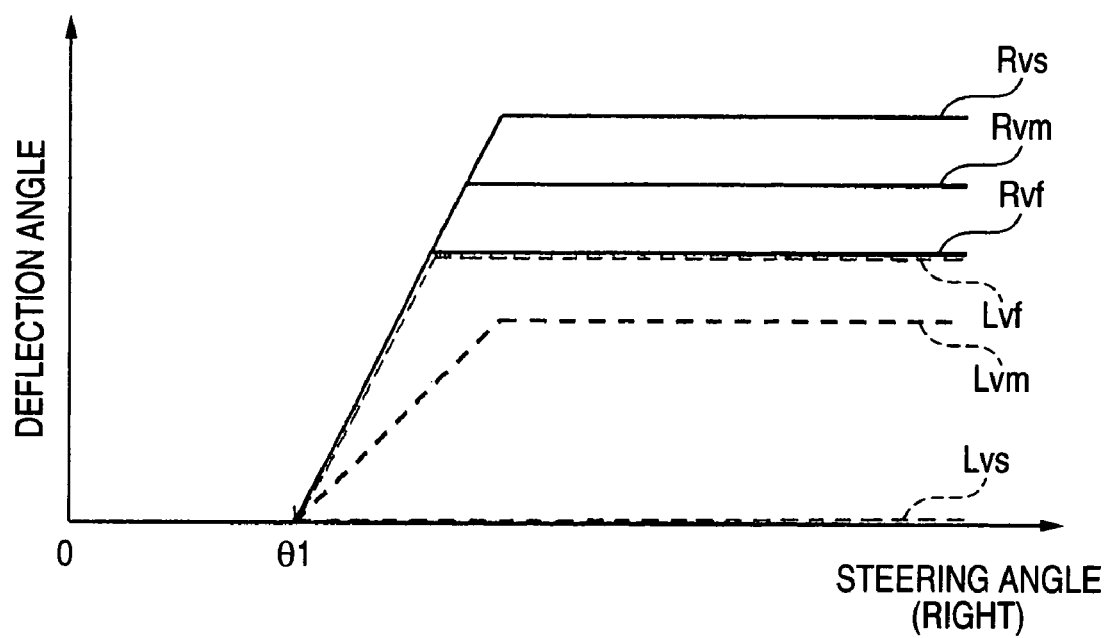
FIG. 6 is a diagram showing the characteristics of the maximum deflection angles of the left and right swivel type lamps with respect to steering angles.

FIG. 6 shows the deflection angle characteristics at the time of steering to the right of the characteristics shown in FIG. 5, in which an abscissa represents a steering angle and an ordinate represents the deflection angle of the swivel type lamp. In the figure, a solid line represents the characteristics of the right swivel type lamp and a broken line represents the characteristics of the left swivel type lamp. Further, in the figure, Rvf, Rvm and Rvs represent the maximum deflection angles of the right swivel type lamp corresponding to the center positions of the high, middle and low speed ranges of FIG. 5, respectively, and Lvf, Lvm and Lvs represent the maximum deflection angles of the left swivel type lamp corresponding to the center positions of the high, middle and low speed ranges of FIG. 5, respectively. In this situation, each of the left and right swivel type lamps is not deflected in a range from the straight traveling state (the steering angle of 0 degrees) to a predetermined steering angle θ 1, whereby this range is a dead zone. When the steering angle becomes larger than the predetermined steering angle θ 1, the deflection angle changes at a predetermined rate in accordance with the steering angle. As to the changing rate of the deflection angle of the swivel type lamp with respect to the steering angle, although the rate is relatively small at the left swivel type lamp, the rate is set to be larger than that of the left swivel type lamp at the right swivel type lamp. In other words, the deflection operation of the right swivel type lamp with respect to the steering operation is made more sensitive as compared with the left swivel type lamp. Further, the maximum deflection angle MAX changes in accordance with the vehicle speed as shown in the characteristics of FIG. 5. With respect to the deflection angle characteristics at the time of steering to the left, since the deflection angle simply increases and reduces in accordance with the steering angle within the maximum deflection angle shown in FIG. 5, further explanation thereof will be omitted. When the vehicle speed changes, the deflection angle characteristics are set to change in a stepwise or stepless manner between Rvs-Rvm-Rvf, thereby to prevent the occurrence of a phenomenon that the swivel type lamp deflects abruptly to rapidly change the light distribution to a large extent.

Figure 7:
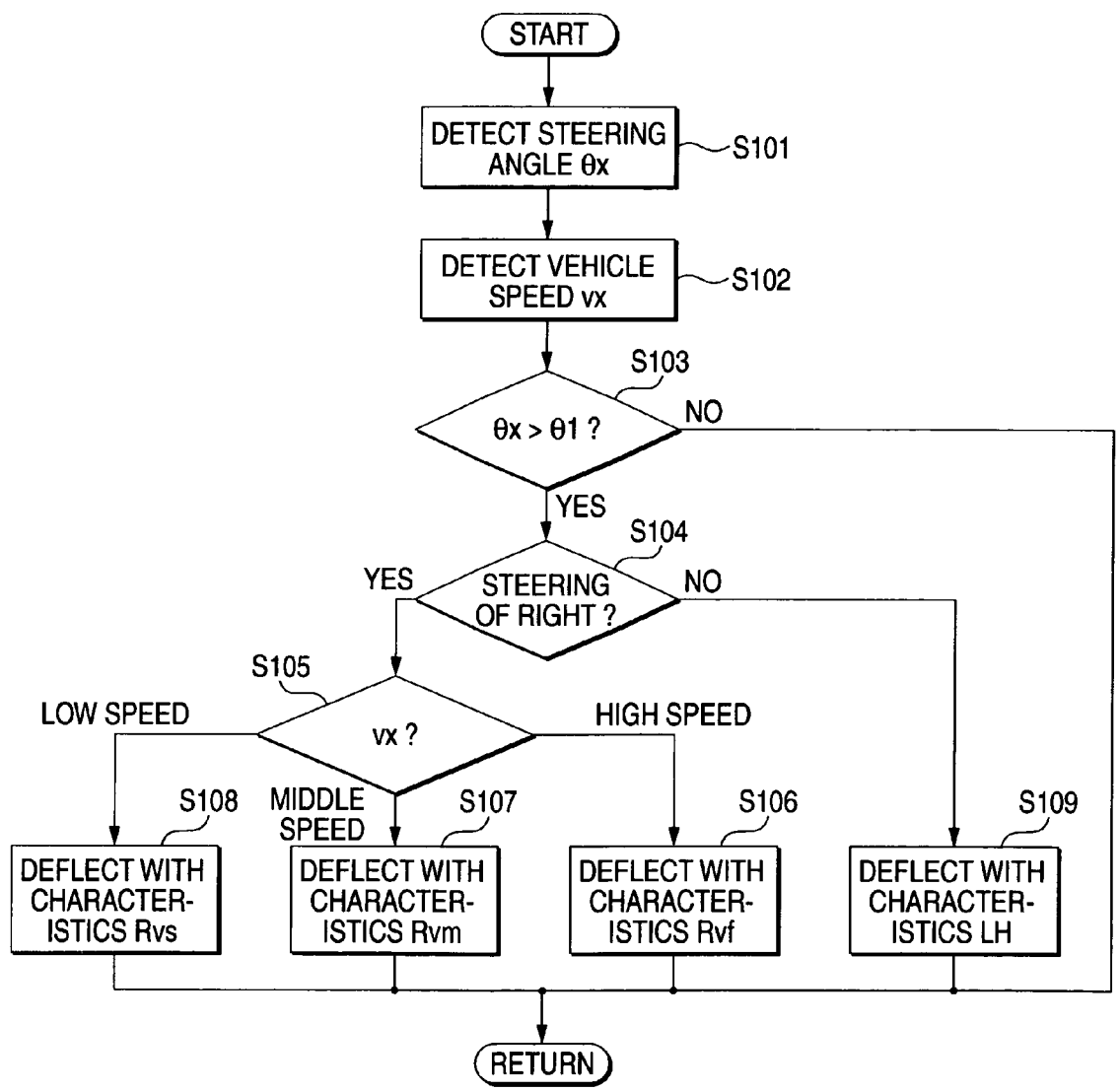
FIG. 7 is a flow chart for explaining the deflection operation.

FIG. 7 is a flowchart for explaining the deflection operation of the left and right swivel type lamps. First, a steering angle θx is detected based on the output of the steering sensor 1A (S101). Then, a vehicle speed Vx is detected based on the output of the vehicle speed sensor 1B (S102). Next, the detected steering angles θ x and θ 1 are compared to each other to determine whether it is within the dead zone or not (S103). When it is determined to be in the dead zone, the swivel type lamps are not subjected to the deflection operation and the process is returned. When it is determined not to be in the dead zone, it is determined whether an automobile is steered to the right or left (S104). When it is determined that the automobile is steered to the right, it is determined whether the automobile is in the high, middle or low speed range based on the detected vehicle speed vx (S105). Then, in accordance with the speed range thus determined and based on the maximum deflection angle characteristics RH, LH of FIG. 5, the right and left swivel type lamps are deflected in accordance with one of the characteristics Rvf, Rvm and Rvs and one of the characteristics Lvf, Lvm, Lvs shown in FIG. 6 (S106, S107, S108). In contrast, when it is determined that the automobile is steered to the left in step S104, the right and left swivel type lamps are deflected based on the characteristics RH, LH shown in FIG. 5 (S109).

In this manner, since the deflection operation characteristics of each of the left and right swivel type lamps is set in accordance with the vehicle speed and the steering operation to the left or right, the irradiation direction can be controlled in the following manner. FIG. 8 shows the light distribution patterns at the time of steering to the left and right when an automobile CAR travels on a curved road at the low, middle and high speeds, respectively. Symbols RH, LH in the figure represent irradiation areas of the right and left swivel type lamps, respectively. In the low speed traveling where an automobile travels on a curved road 1 with a small radius of curvature as shown in FIG. 8(a), at the time of steering to the left, both the left and right swivel type lamps are simultaneously deflected to the left in accordance the steering angle. Since the maximum deflection angle MAX at this time is almost 10 degrees, both the left and right swivel type lamps are deflected to the left by a small deflection angle. On the other hand, at the time of steering to the right, the left swivel type lamp is fixed to the straight traveling direction, while only the right swivel type lamp is deflected to the right in accordance with the steering angle. Thus, at the time of the low speed traveling where an automobile travels on the curved road 1 with the small radius of curvature, the left swivel type lamp irradiates an area just ahead of the automobile in the straight traveling direction, while the right swivel type lamp irradiates an area just ahead of the curved road. As a result, it is possible to irradiate a wide area S1 just ahead of the automobile thereby to secure the visibility of the area S1.

On the other hand, when a radius of curvature of a curved road 2 is large and so the speed is increased to travel at a middle speed as shown in FIG. 8(b), the operation at the time of steering to the left in the middle speed range is almost the same as that in the low speed range. That is, both the left and right swivel type lamps are deflected to the left by a small deflection angle in accordance with the steering angle in a manner that the maximum deflection angle at this time is in a range of about 10 degrees. On the other hand, at the time of steering to the right, the maximum deflection angle to the right direction of the left swivel type lamp is increased gradually in accordance with the speed, while the maximum deflection angle to the right direction of the right swivel type lamp is decreased gradually in accordance with the speed. Under these conditions, the left and right swivel type lamps are deflected in accordance with the steering angle. Thus, at the time of the middle speed traveling where an automobile travels on the curved road 2 with an intermediate radius of curvature, the left swivel type lamp irradiates an area just ahead to an area ahead of the automobile in the slightly right direction from the straight traveling direction, while the right swivel type lamp irradiates an area just ahead or an area ahead of the curved road. As a result, it is possible to irradiate an area S2 just ahead or ahead of the automobile which is slightly narrower than that of the low speed traveling thereby to secure the visibility of the range S2.

Further, when a radius of a curved road 3 is larger as shown in FIG. 8(c), an automobile travels at a high speed. In this high speed traveling, at the time of steering to the left, the maximum deflection angle is set to a small value of almost 5 degrees, and both the left and right swivel type lamps are deflected to the left by a deflection angle almost close to the straight traveling direction in a manner that the maximum deflection angle at this time is in a range of about 5 degrees. On the other hand, at the time of steering to the right, both the left and right swivel type lamps are deflected simultaneously. Further, the maximum deflection angle at this time is gradually reduced in accordance with the vehicle speed. Under these conditions, the left and right swivel type lamps are deflected in accordance with the steering angle. Thus, at the time of the high speed traveling where an automobile travels on the curved road 3 with a large radius of curvature, both the left and right swivel type lamps simultaneously irradiate an area ahead of the automobile in the slightly right direction from the straight traveling direction. Particularly, both the left and right swivel type lamps concentrically irradiate an area S3 ahead of the curved road. As a result, it is possible to secure the visibility of the area S3.

In this embodiment, as shown in FIG. 6, since the dead zone is secured in the deflection angle with respect to the steering angle, even in a case where the steering wheel is steered to the left and right by a small angle like the traveling state close to the straight traveling state, it can prevent occurrence of a phenomenon that the irradiation ranges of the left and right swivel type lamps deflect frequently by a small amount and so a driver feels worrisome.

Figure 9:
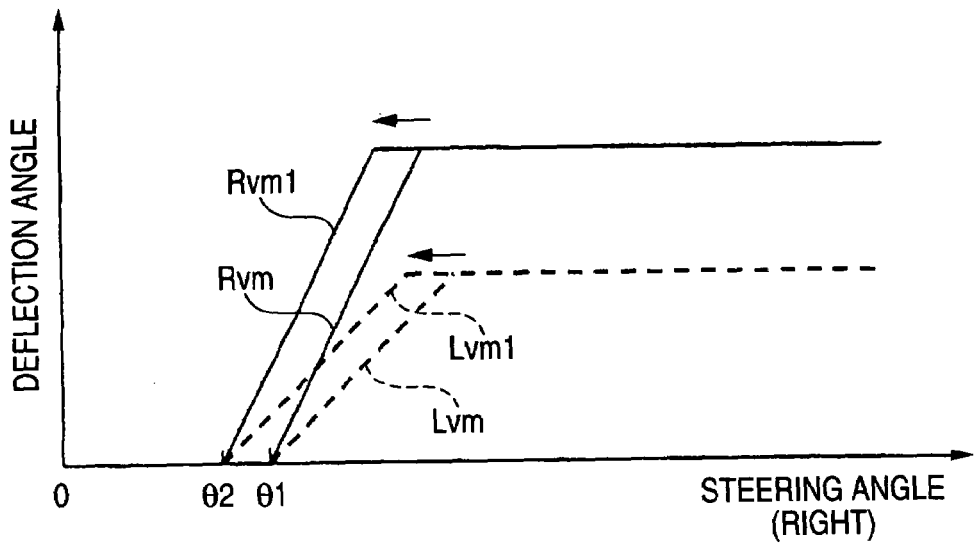
FIGS. 9a and 9b are diagrams showing examples of characteristics for changing a dead zone in the characteristics of FIG. 6.
Figure 9:
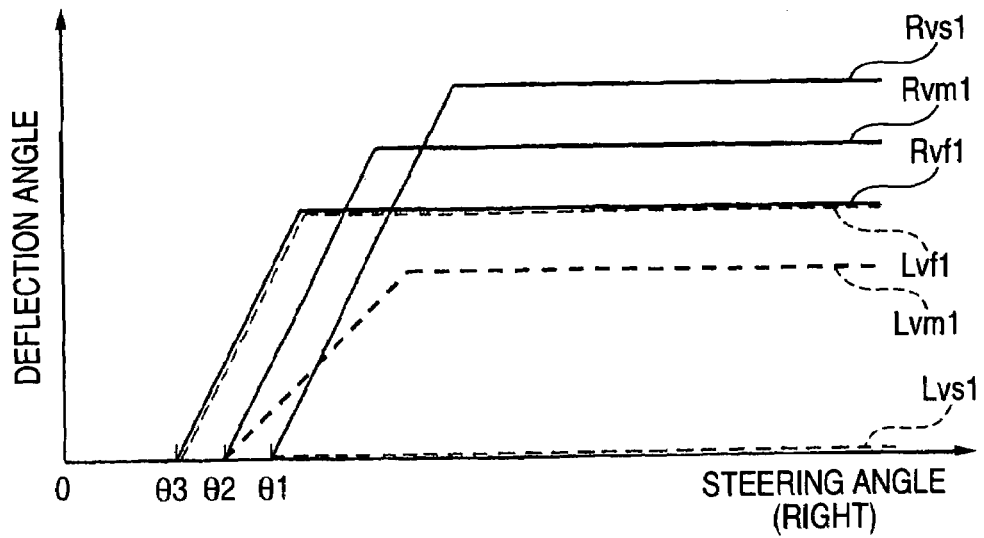

In this case, the width of the dead zone may be changed in accordance with the vehicle speed. FIG. 9(a) is a diagram showing the characteristics in such a case. In this case, the figure shows the characteristics Rvm and Lvm at the middle speed range of the characteristics of FIG. 6, and in which each of the characteristics Rvm1 and Lvm1 thereof is set to have a width of the dead zone θ 2 which is made smaller than that of the dead zone θ 1 of the characteristics Rvm, Lvm at the middle speed range. On the other hand, although not shown, the width of the dead zone of the characteristics Rvs and Lvs of the low speed range is not changed in this case, while the width of the dead zone of the characteristics Rvf and Lvf of the high speed range is made larger than θ 2. According to such a configuration, the characteristics of FIG. 6 are changed into the characteristics Rvs1, Lvs1, Rvm1, Lvm1, Rvf1, Lvf1 shown in FIG. 9(b). In other word, the width of the dead zone of the characteristics Rvs1, Lvs1 at the low speed range is θ 1, the width of the dead zone of the characteristics Rvm1, Lvm1 at the middle speed range is θ 2 smaller than θ 1, and the width of the dead zone of the characteristics Rvf1, Lvf1 at the high speed range is θ 3 smaller than θ 2. According to such a configuration, in view of the fact that the steering angle of an automobile is kept to a state close to the straight traveling state as the vehicle speed increases to the high speed, even when the width of the dead zone is made small, there can sufficiently attain an effect of preventing occurrence of a phenomenon that the swivel type lamps are deflected frequently to change the irradiation area and so a driver feels worrisome. Further, at the time of traveling a curved road with a large radius of curvature, when the steering wheel is turned by a small angle, the swivel type lamps are immediately deflected in accordance with the steering angle, whereby a high response is obtained. In contrast, although the steering angle in the middle or low speed traveling state becomes mostly larger than that in the high speed traveling state, since the width of the dead zone is made larger, the deflection of both the swivel type lamps with respect to the steering operation can be secured. Further, the deflection operation of the swivel type lamps can be prevented at the traveling state close to the straight traveling state and so a driver can be prevented from feeling worrisome.

Figure 10:
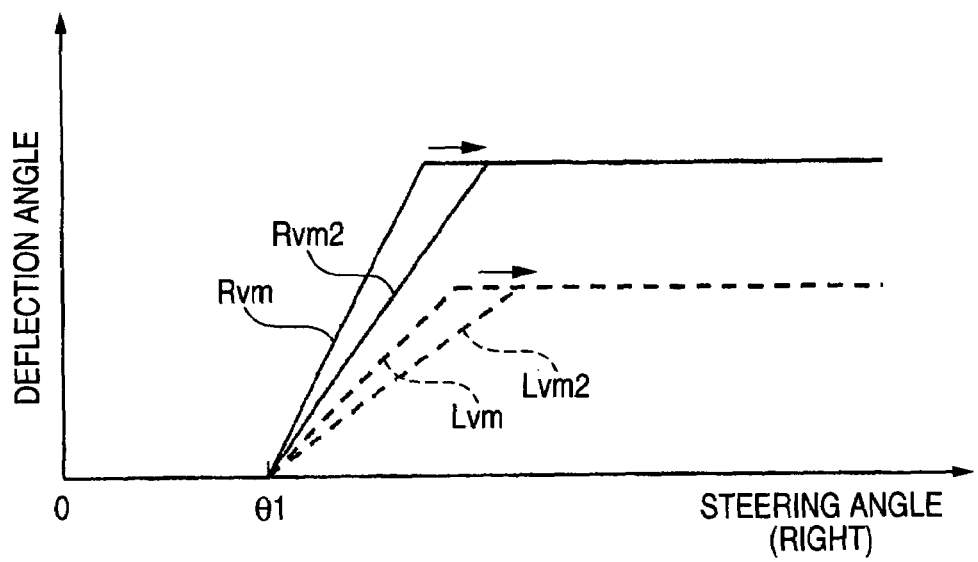
FIGS. 10a and 10b are diagrams showing examples of characteristics for changing a changing rate of the deflection in the characteristics of FIG. 6.
Figure 10:
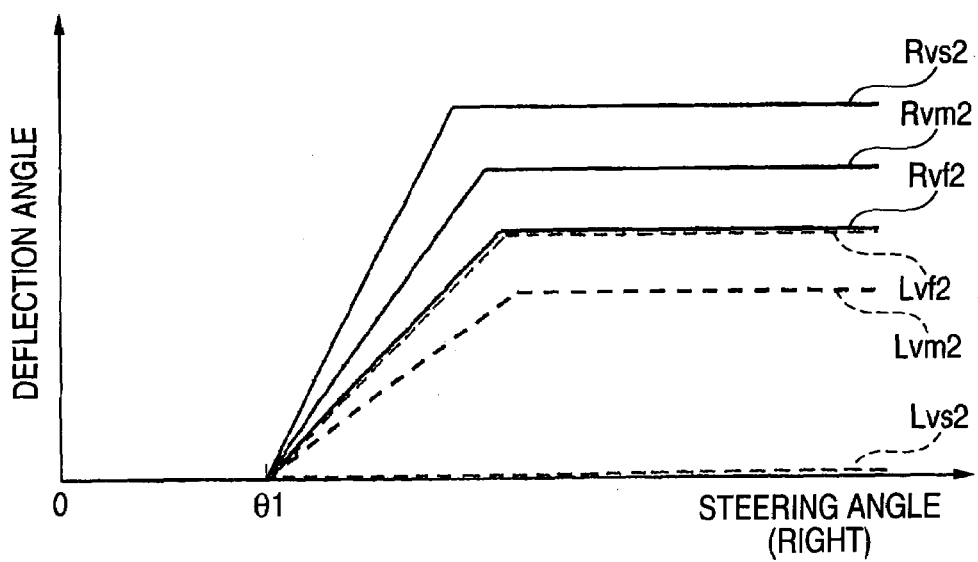

Alternatively, the changing rate of the deflection angle of each of the left and right swivel type lamps with respect to the steering angle may be changed in accordance with the vehicle speed. In this case, the changing rate (inclination) of the deflection angle of each of the left and right swivel type lamps is made smaller as the vehicle speed becomes higher. FIG. 10(a) shows the characteristics Rvm, Lvm at the middle speed range of the characteristics in FIG. 6, and in which the characteristics Rvm, Lvm at the middle speed range are set to characteristics Rvm2, Lvm2 each having a gentle inclination, respectively. Although not shown, the characteristics Rvs, Lvs at the low speed range are scarcely changed in their inclination, while each of the characteristics Rvf, Lvf (not shown) at the high speed range is set to have a larger rate of change of the inclination. According to such a configuration, the characteristics of FIG. 6 are changed into the characteristics Rvs2, Lvs2, Rvm2, Lvm2, Rvf2, Lvf2 shown in FIG. 10(b). It will be understood that the inclinations of these characteristics are greater as the vehicle speed becomes higher as compared with the characteristics shown in FIG. 6. According to these characteristics, since the deflection angle of each of both the swivel type lamps is changed sensitively with respect to the steering angle at the low speed range, the response of the deflection angle with respect to the steering angle can be improved at the time of traveling on a curved road with a small radius of curvature. On the other hand, the deflection angle changes with a gentle inclination with respect to the steering angle as the speed increases to the high speed range, so that the deflection angle of each of both of the swivel type lamps is not changed by much even when the steering angle is changed, whereby an area ahead of the traveling direction can be irradiated stably to improve the visibility.

In the aforesaid embodiment, the characteristics of FIG. 5 are explained using an example where the vehicle speed is changed in the three steps, that is, the low, middle and high speed ranges in order to simplify the explanation. However, the vehicle speed may be changed in two steps or four or more steps. Further, the maximum deflection angle may be changed in a curved manner with respect to the vehicle speed. Similarly, although the characteristics of each of FIGS. 6, 9(a) and (b) and 10(a) and (b) is explained using an example where the deflection angle of the swivel type lamps changes linearly with respect to the steering angle, these characteristics may be set so as to change in a curved manner with respect to the steering angle.

Although the embodiment is explained as to an example where the invention is applied to a headlight in which the projector lamp constituting the swivel type lamp is deflected to the left and right directions to change the optical axis of irradiation, the invention may be applied to a headlight in which only a reflector is deflected or an auxiliary reflector provided independently from a main reflector is deflected to substantially change the irradiation area.

Further, the embodiment is explained using an example where the invention is applied to an automobile traveling according to the left-hand traffic system. In contrast, in the case of an automobile traveling according to the right-hand traffic system, it goes without saying that the deflection characteristics of the left and right swivel type lamps in this case are set to be those of the right and left swivel type lamps of the aforesaid embodiment, respectively.

What is claimed is:

1. A vehicle lighting apparatus comprising lamps for installation at front left and right portions of an automobile, wherein an irradiation direction of the lamps can be deflected to left and right directions in association with a steering operation of a steering apparatus, and deflection angles of the left and right lamps are varied independently of one another in accordance with a vehicle speed and further wherein, when the vehicle speed is a predetermined value or less, only one of the left and right lamps is subjected to a deflecting operation, while when the vehicle speed exceeds the predetermined value, both the left and right lamps are simultaneously subjected to the deflecting operation.

2. A vehicle lighting apparatus according to claim 1, wherein a maximum deflection angle of the left and right lamps is changed in accordance with the vehicle speed.

3. A vehicle lighting apparatus according to claim 1, wherein deflection angles of the left and right lamps are differentiated with respect to different steering directions, respectively.

4. A vehicle lighting apparatus according to claim 1 wherein a width of a dead zone of the deflecting operation with respect to a steering angle is changed in accordance with the vehicle speed.

5. A vehicle lighting apparatus according to claim 1, wherein a rate of change of the deflection angles with respect to a steering angle is changed in accordance with the vehicle speed.

* * * * *